US 6,686,830 B1

(12) United States Patent
Schirtzer

(10) Patent No.: US 6,686,830 B1
(45) Date of Patent: *Feb. 3, 2004

(54) HOMODYNE I/Q TRANSCEIVER FOR A SPREAD SPECTRUM READER

(75) Inventor: Murray Schirtzer, Hartsdale, NY (US)

(73) Assignee: Applied Wireless Identifications Group, Monsey, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 358 days.

(21) Appl. No.: 09/605,676

(22) Filed: Jun. 28, 2000

(51) Int. Cl.[7] .............................. H04Q 5/22; H03D 3/24
(52) U.S. Cl. ...................... 340/10.2; 340/10.3; 375/350
(58) Field of Search ............................. 340/10.2, 10.3, 340/572.1, 10.41; 375/350, 340, 318, 323; 708/300, 301; 455/132, 139, 161.1

(56) References Cited

U.S. PATENT DOCUMENTS

| 4,238,779 | A | * | 12/1980 | Dickinson et al. ............. 371/5 |
| 4,399,439 | A | * | 8/1983 | Upadhyayula ............ 340/14.63 |
| 5,784,686 | A | | 7/1998 | Wu et al. ...................... 455/45 |
| 5,826,180 | A | * | 10/1998 | Golan ......................... 455/302 |
| 5,841,811 | A | * | 11/1998 | Song ........................... 375/235 |
| 5,936,527 | A | | 8/1999 | Isaacman et al. ......... 340/572.1 |
| 5,937,013 | A | * | 8/1999 | Lam et al. ................... 375/340 |
| 6,029,052 | A | * | 2/2000 | Isberg et al. ................ 455/131 |
| 6,046,683 | A | | 4/2000 | Pidwerbetsky et al. 340/825.54 |
| 6,069,581 | A | * | 5/2000 | Bell et al. ...................... 342/70 |
| 6,078,251 | A | * | 6/2000 | Landt et al. ............. 340/10.41 |
| 6,259,991 | B1 | * | 7/2001 | Nysen ......................... 701/300 |
| 6,289,048 | B1 | * | 9/2001 | Richards et al. ............. 375/235 |
| 6,327,312 | B1 | * | 12/2001 | Jovanovich et al. ........ 375/316 |
| 6,353,406 | B1 | * | 3/2002 | Lanzl et al. ................. 342/118 |

* cited by examiner

Primary Examiner—Michael Horabik
Assistant Examiner—Nam Nguyen
(74) Attorney, Agent, or Firm—Salzman & Levy

(57) ABSTRACT

An improved homodyne receiver I/Q receiver for use in RFID and similar applications. The receiver uses a lumped constant network approach to eliminate costly and bulky couplers, circulators and distributed delay lines. A unique single-pole, four-throw ( sp4t) antenna switching arrangement is also provided. The receiver combines small size with improved efficiency and sensitivity to provide a practical, low-cost, hand-held receiver capable of operation over distances of approximately three to five meters. This allows the construction of a hand-held receiver having high performance (i.e., a long reading distance) and good discrimination (i.e., the ability to accurately read closely-spaced tags moving rapidly past a check point). When used with compatible RFID tags, the inventive system may also be used to alter the identification or other information stored within the RFID tags.

14 Claims, 6 Drawing Sheets

| Table 1. Trigonometric Identification of the Transmit and Received Signals at Each Network Tap Point |||||
|---|---|---|---|---|
| | Tap1 | Tap2 | Tap3 | Tap4 |
| Transmit | $E_t \sin(\omega t)$ | $E_t \sin(\omega t + \pi/4)$ | $E_t \sin(\omega t + \pi/2)$ | $E_t \sin(\omega t + 3\pi/4)$ |
| Receive | $E_r \sin(\omega t + \beta + 3\pi/4)$ | $E_r \sin(\omega t + \beta + \pi/2)$ | $E_r \sin(\omega t + \beta + \pi/4)$ | $E_r \sin(\omega t + \beta)$ |

Figure 3a

| Table 2. Lower Order Products Out of 4 Detectors ||
|---|---|
| Detector 1 Output | $(E_t * E_r)/2[\cos(2\omega t + \beta + 3\pi/4) - \cos(\beta + 3\pi/4)]$ |
| Detector 2 Output | $(E_t * E_r)/2[\cos(2\omega t + \beta + 3\pi/4) - \cos(\beta + \pi/4)]$ |
| Detector 3 Output | $(E_t * E_r)/2[\cos(2\omega t + \beta + 3\pi/4) - \cos(\beta - \pi/4)]$ |
| Detector 4 Output | $(E_t * E_r)/2[\cos(2\omega t + \beta + 3\pi/4) - \cos(\beta - 3\pi/4)]$ |

Figure 3b

| Table 3. Lower Order Products Out of 4 Low Pass Filters ||
|---|---|
| Filter 1 Output = O1 | $-(E_t * E_r)/2[\cos(\beta + 3\pi/4)] = (E_t * E_r)/2[\cos(\beta - \pi/4)]$ |
| Filter 2 Output = O2 | $-(E_t * E_r)/2[\cos(\beta + \pi/4)] = (E_t * E_r)/2[\cos(\beta - 3\pi/4)]$ |
| Filter 3 Output = O3 | $-(E_t * E_r)/2[\cos(\beta - \pi/4)] = (E_t * E_r)/2[\cos(\beta + 3\pi/4)]$ |
| Filter 4 Output = O4 | $-(E_t * E_r)/2[\cos(\beta - 3\pi/4)] = (E_t * E_r)/2[\cos(\beta + \pi/4)]$ |

Figure 3c

| The I Channel = O1-O3 | $(E_t * E_r)/2[\cos(\beta - \pi/4) - (E_t * E_r)/2[\cos(\beta + 3\pi/4)]$ |
|---|---|
| The I Channel = O2-O4 | $(E_t * E_r)/2[\cos(\beta - 3\pi/4) - (E_t * E_r)/2[\cos(\beta + \pi/4)]$ |

Figure 3d

HOMODYNE I/Q TRANSCEIVER FOR A SPREAD SPECTRUM READER

FIELD OF THE INVENTION

The invention pertains to long range electronic article surveillance and tracking and, more particularly, to a high sensitivity, lightweight homodyne transceiver for use in an RFID or similar reader for accurately reading data from and/or writing data into tags attached to a multiplicity of items rapidly passing a checkpoint.

BACKGROUND OF THE INVENTION

Many commercial applications require accurate identification of packaged items in transit or inventory. This is often accomplished by placing machine-readable identification tags on the packages such as barcodes or magnetic stripes. But these methods cannot identify packages, which are not visible to the reader. It is also sometimes necessary to change an item's identification characteristic such as its shipping destination or cost. Such identification changes require that a reader write data into the package's tags or labels. Radio frequency identification (RFID) systems, using readers and tags, are currently available for performing these tasks on a variety of items, which are hidden from view in bags, boxes or totes.

The reader in these RFID systems is a transceiver whose transmitter activates an RFID tag. RFID tags are electronic devices that incorporate specific and typically unique identification numbers. These embedded numbers may be "read" by an interrogating radio frequency (RF) transceiver (i.e., transmitter/receiver) system. The RFID tags are generally attached to objects to be identified and/or tracked. These tags are transponders which may be either active (powered by an on-board power source such as a battery) or passive (acquiring energy for operation from the incident RF signal.) Passive tags generally have fewer components than do active tags, making them smaller and less expensive.

The identification number is generally contained in a non-volatile memory device within the RFID tag. When properly activated by an RF field, a passive RFID tag modulates its impedance, causing back-scattering of the RF energy field in its vicinity. The receiver portion of the reader then detects the tag's identification number from within this back-scattered field, thereby identifying all pertinent characteristics of the item to which the tag is attached.

Active RFID tags, on the other hand, have far greater flexibility of design, ranging from a simple battery which powers the ID-containing memory device to complete, active transponder systems using transmitters.

Because of cost considerations, the vast majority of system readers use passive tags and, therefore, receive tag data in the back-scatter mode. Consequently, the reader receiver functions as a homodyne or zero base-band frequency detector. Homodyne receivers utilize a zero beat principle, in which the local oscillator's frequency is identical to that of the carrier. Attempting to detect the back-scattered signal's amplitude modulation envelope with a single detected channel will fail in the homodyne environment. This is because the product detector nulls when the tag is at intervals where the back-scatter receiver's carrier phase at the detector is different from that of the transmitter by odd phase multiples of 90 degrees. Circumventing this problem requires that there be at least one other detector where the phase relationships between carrier and local oscillator differ from the first by 90 degrees. This dual product detection or demodulation scheme is generally referred as "I/Q Demodulation".

Presently, long range systems utilizing passive tags operate in and above the UHF frequency range. Present generation receiver architecture follows one of two basic approaches. In the first approach, a conventional I/Q receiver is used. An I/Q receiver provides two demodulated outputs which are:

The "I" output which is a result of product detecting the received signal against an in-phase local oscillator signal, while the "Q" output is a result of product detecting the received signal against a local oscillator signal with a phase shift of 90 degrees.

Conventional I/Q receivers of the prior art typically utilize couplers, circulators, power dividers and high level mixers. This approach is costly, bulky and has numerous problems, the most serious problem being related to severe local oscillator isolation. If the local oscillator leakage level approaches the input compression level of a conventional mixer, the received backscatter signal will be. "captured" or "Wiped out", thereby rendering the receiver useless. Since poor antenna matching invariably causes severe local oscillator power reflection, it is absolutely imperative that the antenna be perfectly matched for this type of system to function properly.

The second architecture approach for passive tags utilizes tapped transmission lines with a minimum of four detected channels. While these receivers generally perform better than the conventional I/Q receivers, their large distributed transmission line and extra receiver channels add excessive bulk and cost to the overall system. With this design small, handheld readers are almost impossible to fabricate.

DISCUSSION OF THE RELATED ART

U.S. Pat. No. 5,784,686 for IQ COMBINER TECHNOLOGY IN MODULATED BACKSCATTER SYSTEM, issued to You-Sun Wu, et al. describes a homodyne receiver having two outputs: the in-phase or "I" output and the out-of-phase or "Q" output. In the WU, et al. system, the modulated back-scattered signal is composed of an informational signal modulated onto a single-frequency sub-carrier signal. To demodulate the back-scattered signal, the I and Q outputs are combined using an IQ combiner. The IQ combiner introduces a 90 degree phase shift with respect to the frequency of the sub-carrier signal. The outputs are then combined.

U.S. Pat. No. 5,936,527 for METHOD AND APPARATUS FOR LOCATING AND TRACKING DOCUMENTS AND OTHER OBJECTS, issued to Marvin Isaacman, et al., teaches an apparatus and method for a document control system using passive RFID tags attached to documents. ISAACMAN, et al. utilize a plurality of local exciters to interact with the passive RFID tags. The system is under the control of a personal computer.

U.S. Pat. No. 6,046,683 for MODULATED BACKSCATTER LOCATION SYSTEM, issued to Alex Pidwerbetsky, et al. teaches a system utilizing RFID tags whereby items may be located. An interrogator transmits a signal to one or more RFID tags which, in turn, responds by modulating the RF field via conventional back-scattering or by generating a sub-carrier signal that modulates the sub-carrier and forms a reflective signal. The RFID tag's relative direction and velocity relative to the interrogator is determined using analysis of any Doppler shift.

None of these references teaches or suggests the simple, homodyne transceiver of the instant invention. The inventive receiver, unlike the prior art, utilizes specific characteristics of a "lumped network" in combination with an amplitude/phase detector to form an I/Q receiver. Some of the salient advantages of the inventive receiver are:

That, by using the lumped network approach, its size may be significantly reduced relative to receivers of the prior art.

That, by eliminating couplers and circulators used in the prior art, the receiver will remain fully operational regardless of antenna matching.

That, by utilizing the extremely low loss nine pole lumped network, lower power is required from the transmitter and therefore there is higher efficiency and reliability.

That, by utilizing the extremely low loss nine pole lumped network, the receiver sensitivity will be higher than prior arts.

These inventive design improvements over those of the prior art allow miniature hand-held readers to have effective operating distances at least equal to those of larger base-station types. In addition, a unique switch design not shown in the prior art allows a cost-effective and lower loss implementation of a single-pole, four-throw (sp4t) switch from a pair of single-pole, double-throw (spdt) switches.

SUMMARY OF THE INVENTION

In accordance with the present invention, there is provided an improved homodyne transceiver for use in RFID and similar applications. The inventive receiver uses a lumped constant network approach to eliminate costly and bulky couplers, circulators and distributed delay lines. A unique single-pole, four-throw (sp4t) antenna switching arrangement is also used. The inventive receiver combines small size with improved sensitivity and efficiency to provide a practical, low-cost, hand-held reader capable of operation over distances of approximately three to five meters. When used with compatible RFID tags, the inventive system may also be used to alter the information stored within the RFID tags.

It is, therefore, an object of the invention to provide an improved, compact homodyne reader with performance capabilities surpassing those of larger, more expensive systems for use in an RFID-type application.

It is another object of the invention to provide an improved, compact homodyne transceiver, which may be hand-held.

It is a still further object of the invention to provide an improved, compact homodyne transceiver, which may interactively alter the contents of an RFID tag.

It is yet another object of the invention to provide an improved, compact homodyne receiver, which utilizes a lumped network to reduce size and improve reader performance and efficiency.

It is an additional object of the invention to provide an improved, compact homodyne receiver which may use I/Q outputs to help accurately distinguish between closelyspaced articles.

BRIEF DESCRIPTION OF THE DRAWINGS

A complete understanding of the present invention may be obtained by reference to the accompanying drawings, when considered in conjunction with the subsequent detailed description, in which:

FIG. 3a is a table showing by analysis, how the I and Q channel signals are derived from a transmitted carrier and a received back-scatter signal;

FIG. 3b is a table showing by analysis, the low-order products obtained from the four detectors of FIG. 2;

FIG. 3c is a table showing the elimination of second harmonics of the signals shown in FIG. 2b;

FIG. 3d is a table showing the derived I and Q output equations;

DETAILED DESCRIPTION OF THE PREFERRED EMBODIMENT

The present invention provides an improved homodyne transceiver for use in RFID and similar applications.

Figure 1:
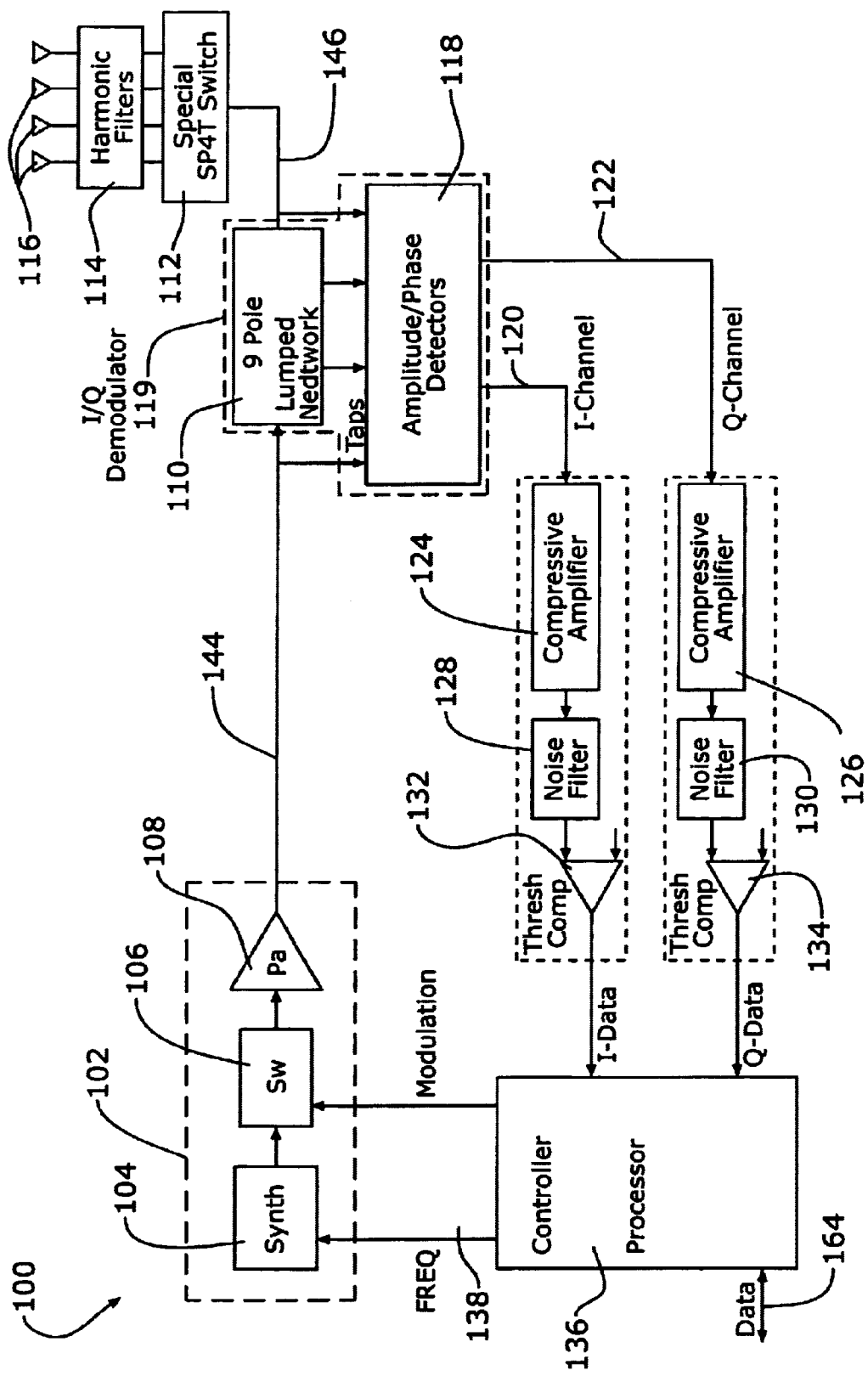
FIG. 1 is a system block diagram of the RFID reader of the present invention.

Referring first to FIG. 1, there is shown a system block diagram of the improved RFID transceiver of the present invention, generally at reference number 100. A transmitter 102 contains a frequency synthesizer 104, which provides a signal to a data-modulating switch 106. Switch 106 provides a modulated signal to a power amplifier 108. Frequency synthesizer 104 is a fast-settling, low-noise, programmable device, which is chosen so that close-in phase noise is minimized even during times of rapid frequency change. A device found suitable for the application is catalog number Si4133G-BT manufactured by Silicon Laboratories. Because FCC Part 15 regulations mandate the dwell time in frequency-hopping applications, these characteristics of frequency synthesizer 104 are very important.

The data-modulating switch 106, when transceiver 100 is in "read" mode, forms commands to be sent to the RFID tags (not shown) in the radiated RF field. The tags may be instructed to send back data (i.e., interrogated), or to go into their sleep (i.e., off) mode. The data-modulating switch 106 is also used when transceiver 100 is in "write" mode for forming the data to be written into the RFID tags.

The operation of the "write" mode is as follows: If it is desired to change the data information written in a tag's memory, a special modulation code, recognizable to a particular tag only, is sent out via the Data Modulator. When the desired tag receives this command, it puts itself into a programmable mode, which allows its memory to be altered. The data is then written into memory by data modulating the transmitter via SW 106 located in 102. After the desired data transfer is complete, the tag is commanded to return to the "read" mode. A data-modulating switch such as catalog number AWS550-S13 manufactured by ANADIGICS has been found suitable for use.

The power amplifier 108 boosts the output signal from the data-modulating switch 106 to a level suitable for creating an RF field of adequate intensity for the particular RFID installation. Power amplifier 108 must minimize distortion and spurious signal generation while operating at a high efficiency. While the inventive circuit exhibits much lower power losses than do circuits of the prior art, the power output of amplifier 108 must still be high enough to overcome the remaining circuit losses. Because of the reduced circuit losses of 110, power amplifier 108 may run cooler than similar devices in prior art receivers. This provides the obvious advantage of improved system reliability. A power amplifier suitable for use in the inventive receiver is catalog number MAX2235 manufactured by MAXIM Integrated Products.

The output of power amplifier 108 is connected to a nine-pole lumped network 110. The output of lowpass lumped network 110 is connected to a single-pole, four-throw switch 112. Switch 112 is connected to the harmonic filters 114 which are connected to antennas 116.

Four taps on lowpass lumped network 110 feed four inputs of the amplitude/phase detector 118 which provides two outputs: In-phase (i.e., "I") output 120 and quadrature (i.e., "Q") output 122. Outputs 120, 122 are connected to inputs of compressive amplifiers 124, 126, respectively. The outputs of compressive amplifiers 124, 126 are connected to the inputs of noise filters 128, 130, respectively. The outputs of noise filters 128, 130 are connected to inputs of threshold comparators 132, 134, respectively. The outputs of threshold comparators 122, 134 are connected to a controller/processor 136. Processor 136 has output 138 connected to frequency synthesizer 104 and output 140 connected to data-modulating switch 106.

Figure 2:
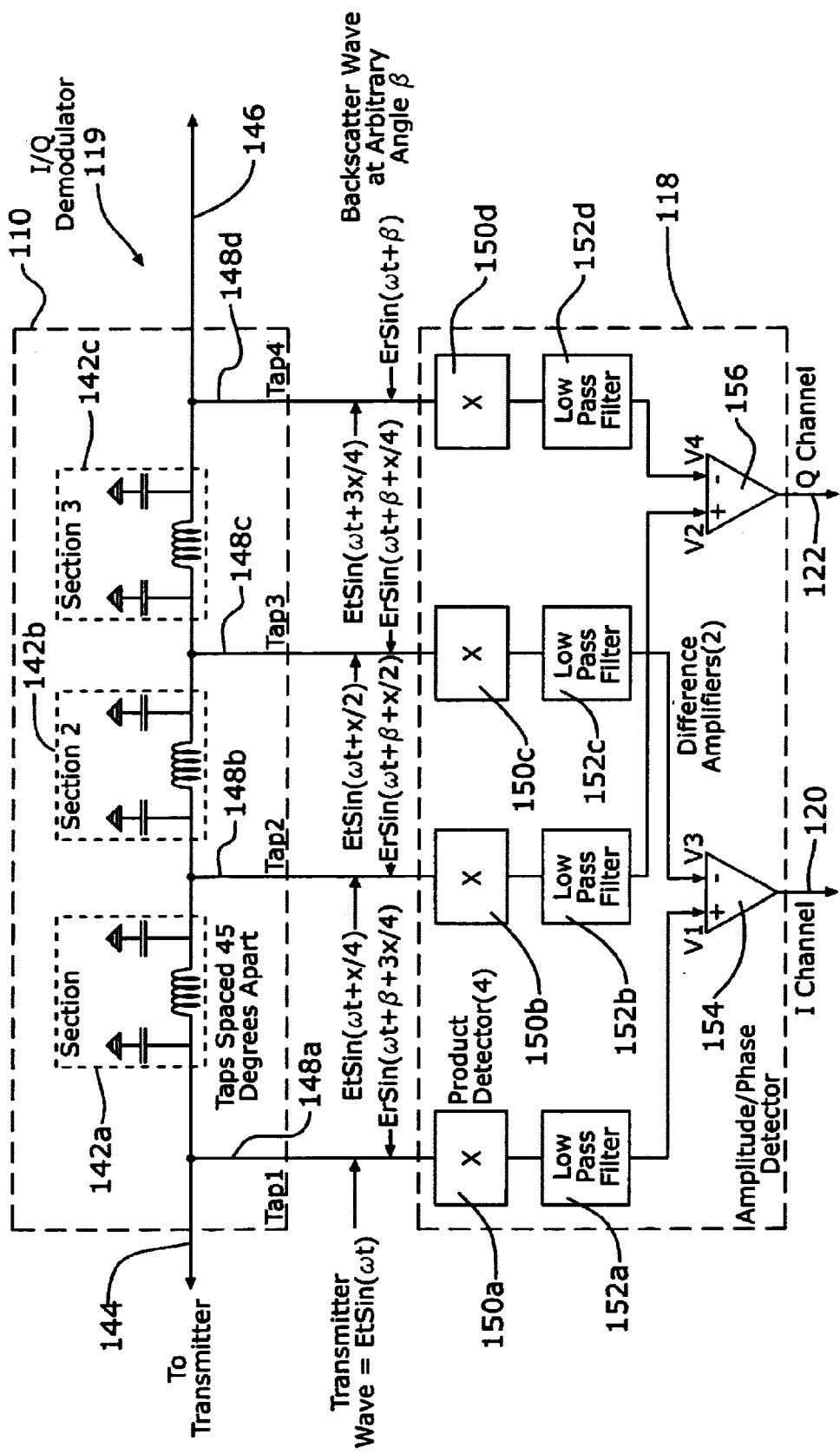
FIG. 2 is an electrical schematic diagram of an I/Q demodulator consisting of a three section lumped network with four taps and an amplitude/phase detector consisting of product detectors, low pass filters and difference amplifiers.

Referring now also to FIG. 2, there is shown a detailed schematic diagram of the I/Q demodulator 119 consisting of a nine-pole lowpass lumped network 110 and an amplitude/phase detector 118. Lumped network 110 is a three-section 142a, 142b, 142c π filter. A series of four taps 148a, 148b, 148c, 148d are provided between each of the lumped network sections 142a, 142b, and 142c. Each tap 148a, 148b, 148c, 148d is connected to the input of a product detector 150a, 150b, 150c, 150d, respectively. The outputs of product detectors 150a, 150b, 150c, 150d are connected to inputs of lowpass filters 152a, 152b, 152c, 152d, respectively. Outputs of lowpass filters 152a, 152c are connected to differential inputs of difference amplifier 154. Likewise, outputs of lowpass filters 152b, 152d are connected to difference amplifier 156.

Harmonic filters 114 (FIG. 1) are needed to reduce the harmonic signals so that they meet the radiation requirements specified in part 15 of the Federal Communications Commission (FCC) requirements. Specifically, these requirements limit the allowable harmonics transmitted to no more than 500 microvolts per meter at a distance of 3 meters away.

Compressive amplifiers 124, 126 in combination with filters 128, 130 and threshold comparators 132, 134, form two high gain, amplitude compressing channels, which preserve data integrity of the tag's back-scatter under an extremely large dynamic range. The preferred embodiment of the inventive reader is designed as a multi-protocol system which can accommodate various information bandwidth requirements. Therefore, the compressive amplifiers 124, 126 are designed to accommodate large information bandwidths with minimal noise and low group delay distortion. Non-linear group delay could cause data identification errors. The bandwidth of noise filters 128, 130 is programmable so that, tag protocols with narrow information bandwidths can be optimized. The threshold comparators 132, 134 provide digital signals for processing, while minimizing "False Alarms" (i.e., invalid data).

Controller/processor 136 provides primary data processing and controls the frequency and modulation of the transmitter 102. The I and Q channels are examined simultaneously for valid data and then processed. Processor 136 has a data interface 164 which allows the inventive reader to be readily adapted to systems applications hardware which form no part of the instant invention.

The unique I/Q demodulator 119 formed by nine-pole lumped network 110 and the amplitude/phase detector 118 form the heart of the receiver of the instant invention.

In operation, an RF wave from the transmitter 102 enters lumped network 110 from connection 144. As the wave passes left-to-right through sections 142a, 142b, and 142c, it is phase delayed by 45 degrees through each section. Consequently, the output at tap 1 148a is undelayed, the output at tap 2 148b is delayed by 45 degrees, 90 degrees at 148c and 135 degrees at 148d.

Similarly, as a back-scattered signal (not shown) is received at one of the antennas 116, it enters lumped network 110 from connection 146 and passes right-to-left through sections 142c, 142b, and 142a. The received (back-scattered) signal at tap 4 148d can be assumed for this discussion to be non-delayed, the signal at tap 3 148c is delayed by 45 degrees, 90 degrees at 148b and 135 degrees at 148a. As a transmitted wave and a received (back-scattered) wave, which are assumed to be in phase with one another, pass through the nine-pole lowpass lumped network 110 in opposite directions, the relative phase shift between them doubles as they pass through each lumped network section. The net result is the creation of a relative shift of 90 degrees between each tap (tap1 to tap2 to tap3 to tap4), and 180 degrees between alternate taps (tap1 to tap3, tap2 to tap4).

The "I" channel signal is created as follows:

The phase shifted waves from the two alternate taps 148a and 148c are applied to the inputs of product detectors 150a and 150c, and the detected products are filtered by 152a and 152c and then subtracted by difference amplifier 154. Similarly the "Q" Channel is formed from the waves between 148b and 148d, filters 152b and 152d and difference amplifier 156. The important distinction between the "I" channel at 120 and the "Q" channel at 122 is that they operate across sets of taps that are offset by relative phase shift of 90 degrees. Therefore, if the relative delay from tap1 (148a) and tap3 (148c) happens to be 180 degrees which will cause the "I" channel to null, the relative delay across tap2 and tap4 will be offset by 90 degrees, which will produce an output at 122 just 3 dB below maximum. Therefore, data will never be lost (See FIG. 4).

Referring now to the Tables shown in FIGS. 3a, 3b, 3c, 3d, respectively, there are shown the mathematical relationships of signals as they pass through the inventive nine-pole lumped network 110 and amplitude/phase detector 118. FIG. 3a shows the relationship of both the transmitted and received signals at each of the four taps 148a, 148b, 148c, 148d (FIG. 2).

FIG. 3b shows the low-order products obtained from the four product detectors 150a, 150b, 150c, 150d (FIG. 2).

FIG. 3c shows the elimination of second harmonics of the output signals from product detectors 150a, 150b, 150c, 150d (FIG. 2) shown in FIG. 3b.

FIG. 3d shows the In-Phase(I) and Quadrature-Phase (Q) signals 120, 122 (FIG. 1), respectively.

Figure 4:
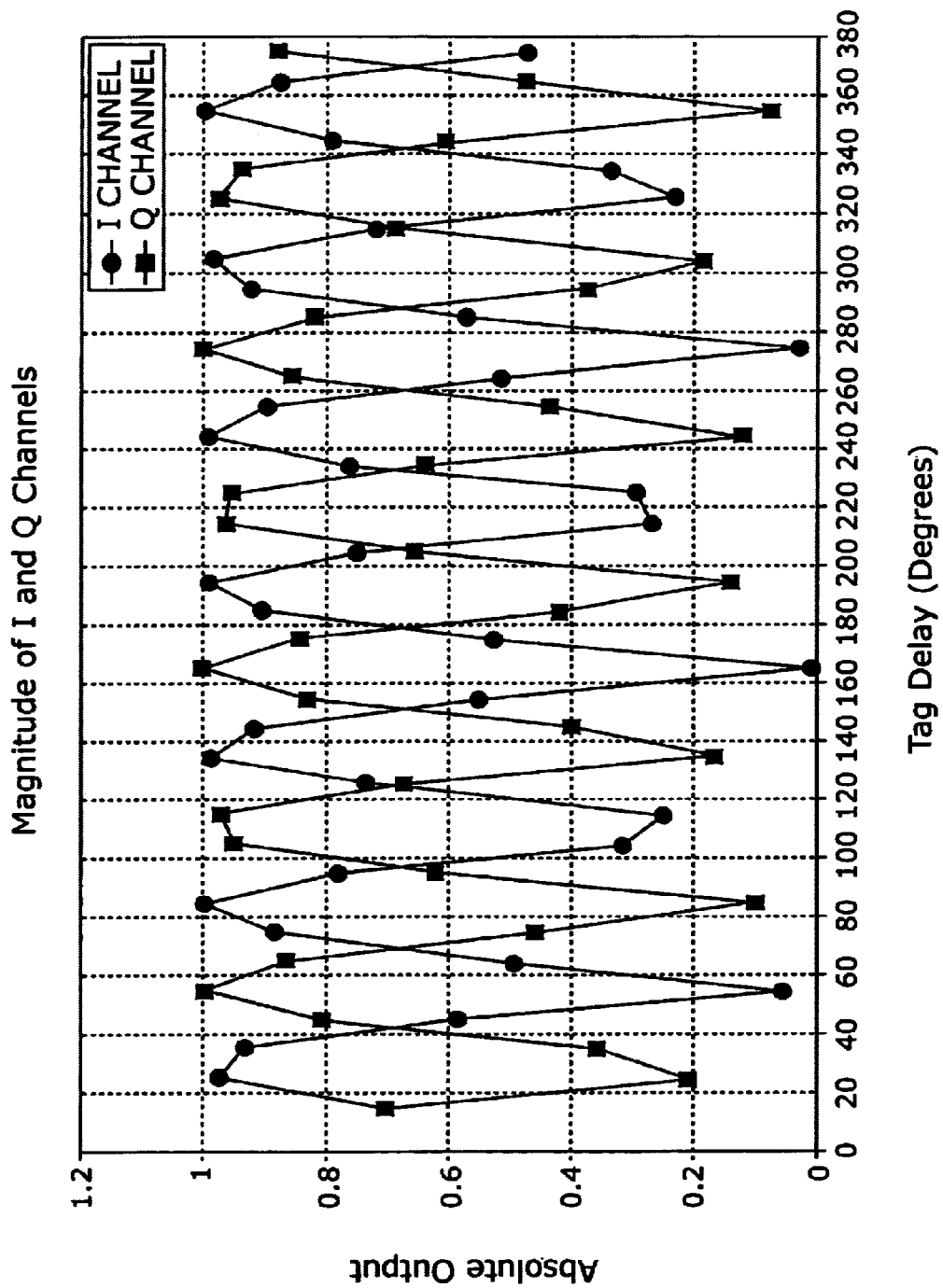
FIG. 4 is a plot of the I and Q channels which verifies that the received back-scattered signal will always be at an adequate level for tag detection at either the I or Q channel regardless of the tag's spatial location within range.

Referring now to FIG. 4, there is shown a plot of the I and Q output signals 120, 122, respectively, showing how the signals vary as an RFID tag (not shown) moves along one wavelength (λ) relative to the reader. As the I signal dips, there is a corresponding peak in the Q signal. Consequently, by simultaneously processing both the I and Q signals 120, 122, the likelihood of properly reading a tag is 100%, regardless of the position of the tag relative to the reader.

In some practical applications such as movement through a portal entry, multiple antennas 116 are required to guarantee absolute identification of tags which may be randomly oriented. Generally, the antennas are time sequenced so that only one transceiver is required. To accomplish the selective attachment of multiple antennas, a switch is generally used. For the embodiment chosen for purposes of disclosure, a single-pole, four-throw (sp4t) switch has been chosen. It will be obvious to those skilled in the art that other antenna 116/switch 112 combinations may be required for a particular operating environment. Generally, RF sp4t switches are readily available for operation at power levels below 1 Watt or for DC operating voltages above 5 volts. There are, however, few commercially available sp4t switches capable of handling the RF power generated by transmitter 102 of the inventive reader using only 5 volts of DC power.

Figure 5A:
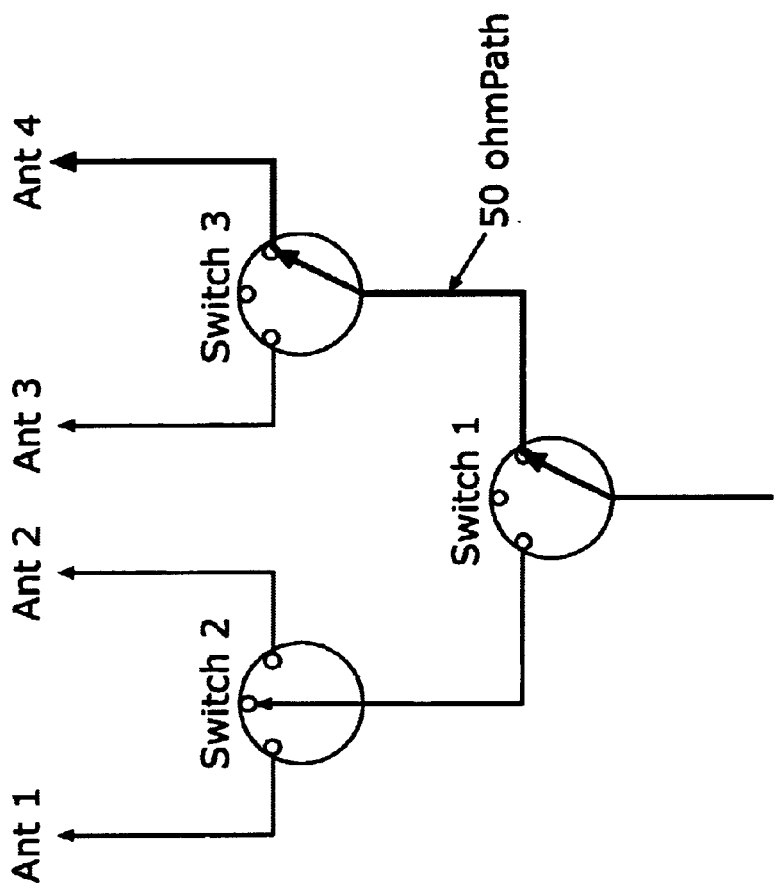
FIG. 5a is a schematic diagram of a single-pole, four-throw switch of the prior art.

Referring now to FIG. 5a, there is shown an electrical schematic showing how three conventional gallium arsenide or other similar sp2t switches, which are well known to those skilled in the art and readily available, may be connected to form the required sp4t switch 112.

Figure 5B:
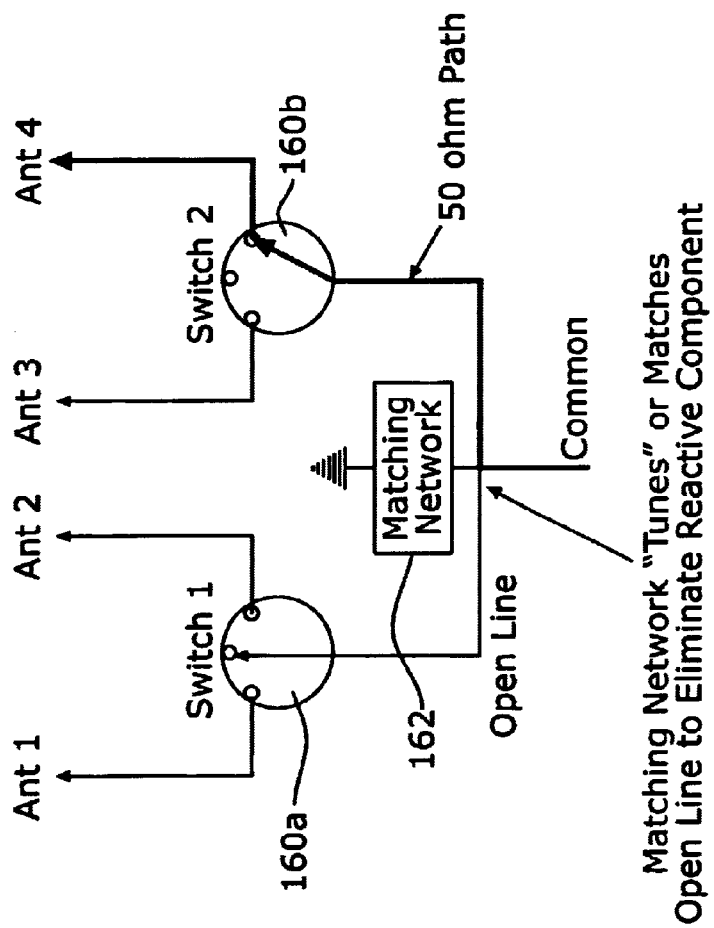
FIG. 5b is a schematic diagram showing a novel implementation of a single-pole, four-throw switch of the present invention.

A novel method for constructing the required sp4t switch using only two conventional gallium arsenide devices is shown in FIG. 5b. Gallium arsenide switches 160a, 160b each have an "off" or "open" position, which is mostly reactive with a low conductive component. This high impedance can be "tuned" out by a matching network 162. So the open or unused switch can effectively be de-coupled from the signal path. A voltage standing wave ratio (VSWR) less than 2:1 can easily be maintained.

It is important to remember that the inventive reader embodiment is very tolerant of non-ideal matching conditions to the antennas 116. Conventional readers of the prior art which utilized circulators can fail to operate because of local oscillator reflection if there are significant antenna mismatches. This problem has been eliminated in the inventive reader design.

Since other modifications and changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. An RFID transceiver for selectively reading data from and writing data to a plurality of RFID tags, comprising:
    a) a controller adapted for two-way communication with an external device and comprising an I-channel and a Q-channel input;
    b) a transmitter operatively connected to said controller, comprising means for generating an RF signal having a frequency determined by said controller, and a modulator operatively,connected to said means for generating an RF signal for modulating an RF signal received therefrom and providing a modulated RF signal at an output signal port;
    c) a lumped network having an electrical tap disposed between each of said multiple sections thereof, said network having a first terminus operatively connected to said output signal port, and a second, opposing terminus, said network imparting a phase shift of approximately 45 degrees in each of said multiple sections thereof to a signal applied to said first terminus and, imparting a substantially identical phase shift in each of said multiple sections to a signal applied to said second terminus, said respective phase shifts being measurable between adjacent ones of said taps, such that in-phase signals applied to said first terminus and said second terminus of said network exhibit a relative phase shift of approximately 90 degrees in each of said sections of said network and, whereby a relative phase shift of approximately 180 degrees is measurable between alternate ones of said taps;
    d) means for switching a signal having an input operatively connected to said second terminus, and an output selectively connectable to one of a plurality of antennas; and
    e) an amplitude/phase detector comprising at least a plurality of detector inputs, each operatively connected to a respective one of said taps; a plurality of product detectors each having an input and an output, each of said product detectors having its input connected to a respective one of said plurality of detector inputs; a first difference amplifier having a pair of difference amplifier inputs operatively connected to a first and a third of said product detector outputs, said first difference amplifier having an I-channel output and, a second difference amplifier having a pair of difference amplifier inputs operatively connected to a second and a forth of said product detector outputs, said second difference amplifier having a Q-channel output, said I-channel and said Q-channel outputs being operatively connected to a respective one of said I-channel and said Q-channel inputs of said controller;

whereby data from said external device may be transmitted to one of said RFID tags and data may be received from one of said RFID tags and sent to said external device.

2. The RFID transceiver for selectively reading data from and writing data to a plurality of RFID tags as recited in claim 1, wherein said means for generating an RF signal comprises a frequency synthesizer.

3. The RFID transceiver for selectively reading data from and writing data to a plurality of RFID tags as recited in claim 1 further comprising a power amplifier disposed between said modulator and said output signal port.

4. The RFID-transceiver for selectively reading data from and writing data to a plurality of RFID tags as recited in claim 1 wherein said modulator comprises a data modulating switch.

5. The RFID transceiver for selectively reading data from and writing data to a plurality of RFID tags as recited in claim 1, wherein said network comprises a symmetrical, lumped constant network.

6. The RFID transceiver for selectively reading data from and writing data to a plurality of RFID tags as recited in claim 5, wherein said symmetrical, lumped constant network comprises a nine-pole low pass lumped network.

7. The RFID transceiver for selectively reading data from and writing data to a plurality of RFID tags as recited in claim 6, wherein said nine-pole low pass lumped network comprises at least three (pi) sections.

8. The RFID transceiver for selectively reading data from and writing data to a plurality of RFID tags as recited in claim 7, wherein said taps comprise at least four taps.

9. The RFID transceiver for selectively reading data from and writing data to a plurality of RFID tags as recited in claim 1, wherein said means for switching a signal comprises an sp4t switch.

10. The RFID transceiver for selectively reading data from and writing data to a plurality of RFID tags as recited in claim 9, wherein said sp4t switch comprises at least two sp2t switches and a matching network.

11. The RFID transceiver for selectively reading data from and writing data to a plurality of RFID tags as recited in claim 1, wherein said act of writing data to a plurality of RFID tags comprises transmitting at least one of: a command, and data to be stored to one of said plurality of RFID tags.

12. The RFID transceiver for selectively reading data from and writing data to a plurality of RFID tags as recited in claim 11, wherein said command comprises a command to alter data stored in said one of said plurality of RFID tags.

13. The RFID transceiver for selectively reading data from and writing data to a plurality of RFID tags as recited in claim 1 further comprising a harmonic filter disposed between and operatively connected said means for switching a signal and said plurality of antennas.

14. The RFID transceiver for selectively reading data from and writing data to a plurality of RFID tags as recited in claim 1, is implemented as a handheld RFID transceiver.

* * * * *